(12) United States Patent
Sun

(10) Patent No.: US 8,297,116 B2
(45) Date of Patent: Oct. 30, 2012

(54) QUICK REMOVABLE POSITION SENSOR

(75) Inventor: Ming-Shian Sun, Kaohsiung Hsien (TW)

(73) Assignee: Whetron Electronics Co., Ltd., Kaohsiung County (TW)

( * ) Notice: Subject to any disclaimer, the term of this patent is extended or adjusted under 35 U.S.C. 154(b) by 407 days.

(21) Appl. No.: 12/713,696

(22) Filed: Feb. 26, 2010

(65) Prior Publication Data
US 2011/0209535 A1 Sep. 1, 2011

(51) Int. Cl.
*G01M 15/00* (2006.01)
(52) U.S. Cl. .................................................. 73/117.02
(58) Field of Classification Search ............... 73/117.02
See application file for complete search history.

(56) References Cited

U.S. PATENT DOCUMENTS

| | | | | |
|---|---|---|---|---|
| 5,301,111 A | * | 4/1994 | Utsui et al. | 701/37 |
| 5,910,258 A | * | 6/1999 | Kazirskis et al. | 219/60 R |
| 6,420,697 B1 | * | 7/2002 | Donner et al. | 250/231.14 |
| 6,697,680 B2 | * | 2/2004 | Lin et al. | 700/13 |
| 6,865,462 B2 | * | 3/2005 | Yao et al. | 701/41 |
| 8,000,860 B2 | * | 8/2011 | Wu et al. | 701/41 |
| 2002/0089142 A1 | * | 7/2002 | Lukac | 280/93.512 |
| 2007/0235240 A1 | * | 10/2007 | Lauer et al. | 180/204 |
| 2010/0045013 A1 | * | 2/2010 | Hirschfeld et al. | 280/779 |
| 2010/0114523 A1 | * | 5/2010 | Waite et al. | 702/151 |

* cited by examiner

*Primary Examiner* — Lisa Caputo
*Assistant Examiner* — Jamel Williams
(74) *Attorney, Agent, or Firm* — Chun-Ming Shih

(57) ABSTRACT

In a quick removable position sensor installed onto a steering wheel of a motor vehicle, a transmission mechanism is sheathed onto a steering wheel axle, such that the transmission mechanism and the steering wheel axle can perform a turning movement, and an end of an angular sensor is connected to the steering wheel axle, and another end of the angular sensor is connected to the transmission mechanism, for receiving a turning signal generated and outputted by a turning of the transmission mechanism, and a casing is provided for covering the steering wheel axle, the transmission mechanism and the angular sensor, such that the components in the casing can perform the turning movement and receive the turning signal.

4 Claims, 4 Drawing Sheets

QUICK REMOVABLE POSITION SENSOR

BACKGROUND OF THE INVENTION

1. Field of the Invention

The present invention relates to a quick removable position sensor, and more particularly to a quick removable position sensor that can be installed or removed more quickly through its simple components.

2. Description of Related Art

Conventional steering wheel position sensors come with different ways of installing the conventional steering wheel position sensors to a steering wheel, since the axle size and internal components of the steering wheel manufactured by major automobile manufacturers are different.

However, if it is necessary to repair or replace a failed conventional steering wheel position sensor, major components in a motor vehicle and a dashboard installed proximate to the steering wheel must be removed first, before the conventional steering wheel position sensor can be examined, or the entire steering wheel and its axle must be removed for changing the conventional steering wheel position sensor, after the failure of the conventional steering wheel position sensor is confirmed. After the removal of the aforementioned components, the conventional steering wheel position sensor is replaced, and the related components are reinstalled. In the worst scenario, the motor vehicle cannot be operated due to human negligence or the reinstallation of components is improper, such that the transmission mechanism of the motor vehicle may become malfunctioned, and the malfunctioned transmission mechanism may jeopardize the safety of drivers and other people.

Therefore, it is a main subject for automobile manufacturers to provide a quick removable steering wheel position sensor to overcome the foregoing shortcomings.

SUMMARY OF THE INVENTION

It is a primary objective of the present invention to provide a quick removable position sensor, wherein a transmission mechanism is sheathed onto a steering wheel axle, so that the transmission mechanism and the steering wheel axle can perform a turning movement, and an end of an angular sensor is connected to the steering wheel axle, and another end of the angular sensor is connected to the transmission mechanism, and a turning signal is outputted from the turning of the transmission mechanism, and a casing is provided for covering the steering wheel axle, the transmission mechanism and the angular sensor, such that components in the casing can perform the turning movement and receive the turning signal respectively.

To achieve the objective of the present invention, the quick removable steering wheel position sensor comprises: a steering wheel axle; a transmission mechanism sheathed onto the steering wheel axle, such that the transmission mechanism and the steering wheel axle can perform a turning movement; an angular sensor, having an end connected to the steering wheel axle and another end connected to the transmission mechanism, and provided for receiving a turning signal outputted from a turning of the transmission mechanism; and a casing, for covering the steering wheel axle, the transmission mechanism and the angular sensor, such that the components in the casing can perform the turning movement and receive the turning signal respectively.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
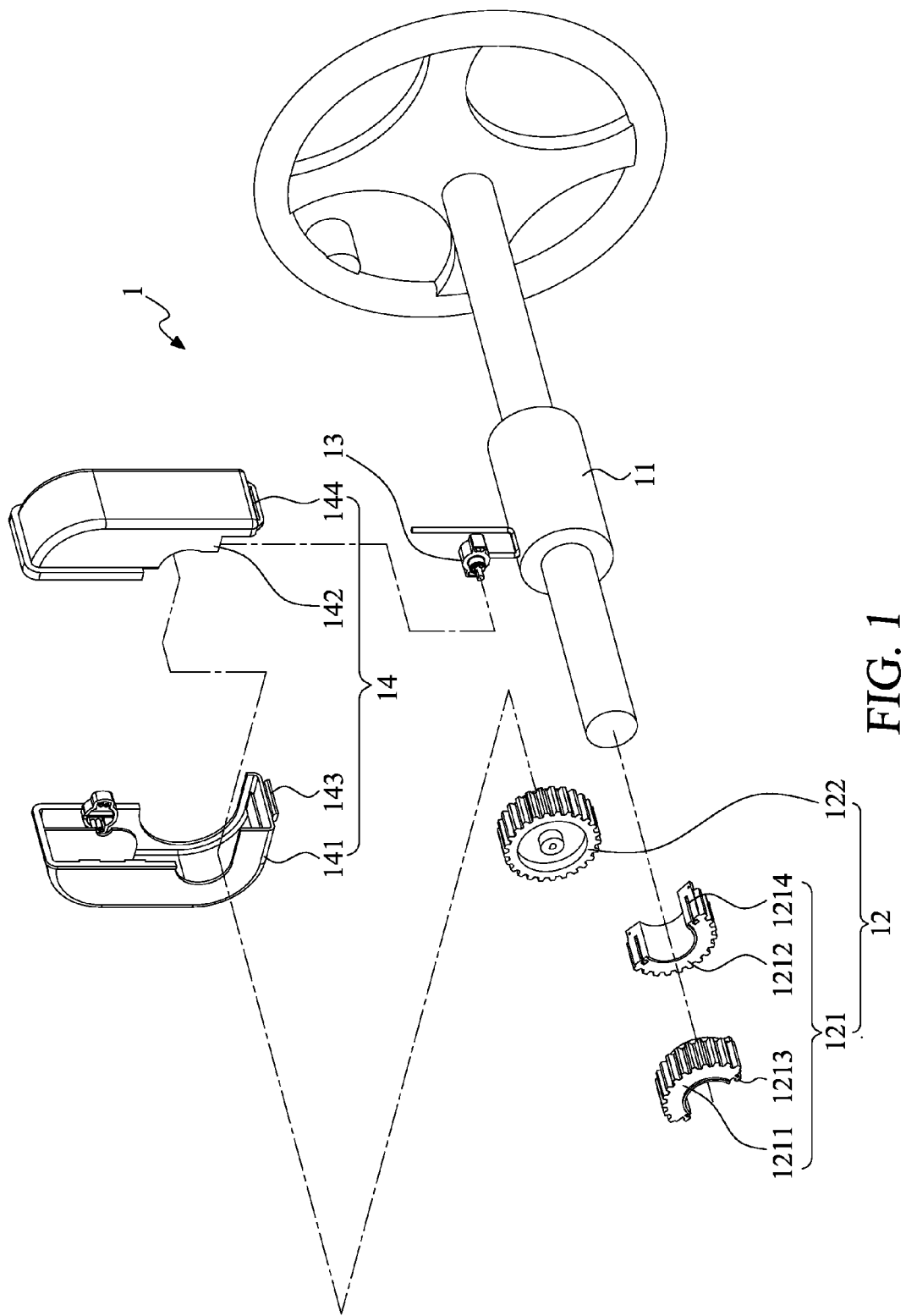
FIG. 1 is an exploded view of a first preferred embodiment of the present invention.
Figure 2:
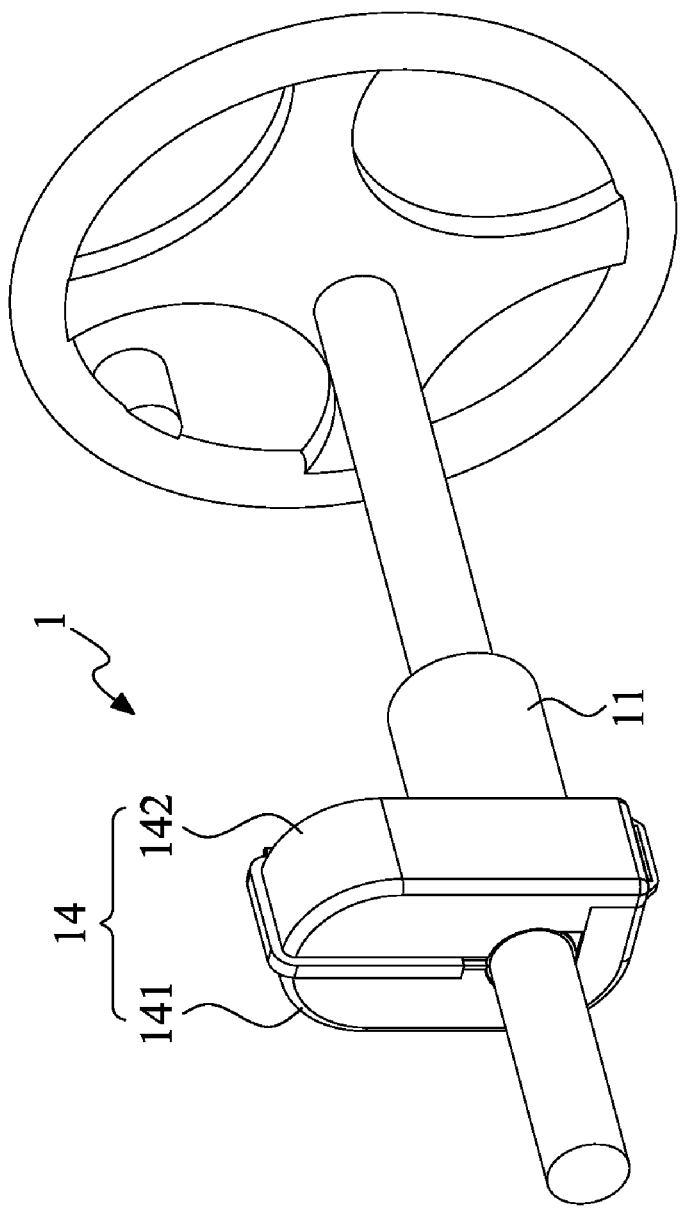
FIG. 2 is a perspective view of a first preferred embodiment of the present invention.

With reference to FIGS. 1 and 2 for an exploded view and a perspective view of a quick removable position sensor 1 in accordance with a first preferred embodiment of the present invention, the quick removable position sensor 1 is installed onto a steering wheel of a motor vehicle, and comprises a steering wheel axle 11, a transmission mechanism 12, an angular sensor 13 and a casing 14.

The transmission mechanism 12 (as shown in FIG. 1) is sheathed onto the steering wheel axle 11, such that the transmission mechanism 12 and the steering wheel axle 11 can perform a turning movement.

The angular sensor 13 (as shown in FIG. 1) has an end connected to the steering wheel axle 11 and another end connected to the transmission mechanism 12, for receiving a turning signal outputted according to a turning of the transmission mechanism 12.

The casing 14 (as shown in FIG. 1) is provided for covering the steering wheel axle 11, the transmission mechanism 12 and the angular sensor 13, such that the components in the casing 14 can perform the turning movement and receive the turning signal respectively.

In this preferred embodiment, the transmission mechanism 12 is comprised of a first transmission gear 121 and a second transmission gear 122 (as shown in FIG. 1), wherein the first transmission gear 121 is comprised of two semi-circular transmission gears 1211, 1212, a first snap portion 1213 and a second snap portion 1214 disposed on a side of the two semi-circular transmission gears 1211, 1212, such that after the snap portions 1213, 1214 are latched, the first transmission gear 121 can be sheathed onto the steering wheel axle 11, and if the steering wheel axle 11 is turned in a direction, the first transmission gear 121 will be driven to turn, and gear teeth formed at the external periphery of the second transmission gear 122 are stacked on and engaged with gear teeth at the external periphery of the first transmission gear 121, such that when the first transmission gear 121 is turned, the second transmission gear 122 is driven to turn as well.

In this preferred embodiment, the casing 14 is comprised of a first casing 141 and a second casing 142 (as shown in FIG. 1), a first latch portion 143 and a second latch portion 144 formed at external peripheries of the first casing 141 and the second casing 142 respectively, such that after the first and second latch portions 143, 144 are latched with each other, the casing 14 is covered onto the steering wheel axle 11, the transmission mechanism 12 and the angular sensor 13 for protecting the components from being in contact with the outside or damaged.

Figure 3:
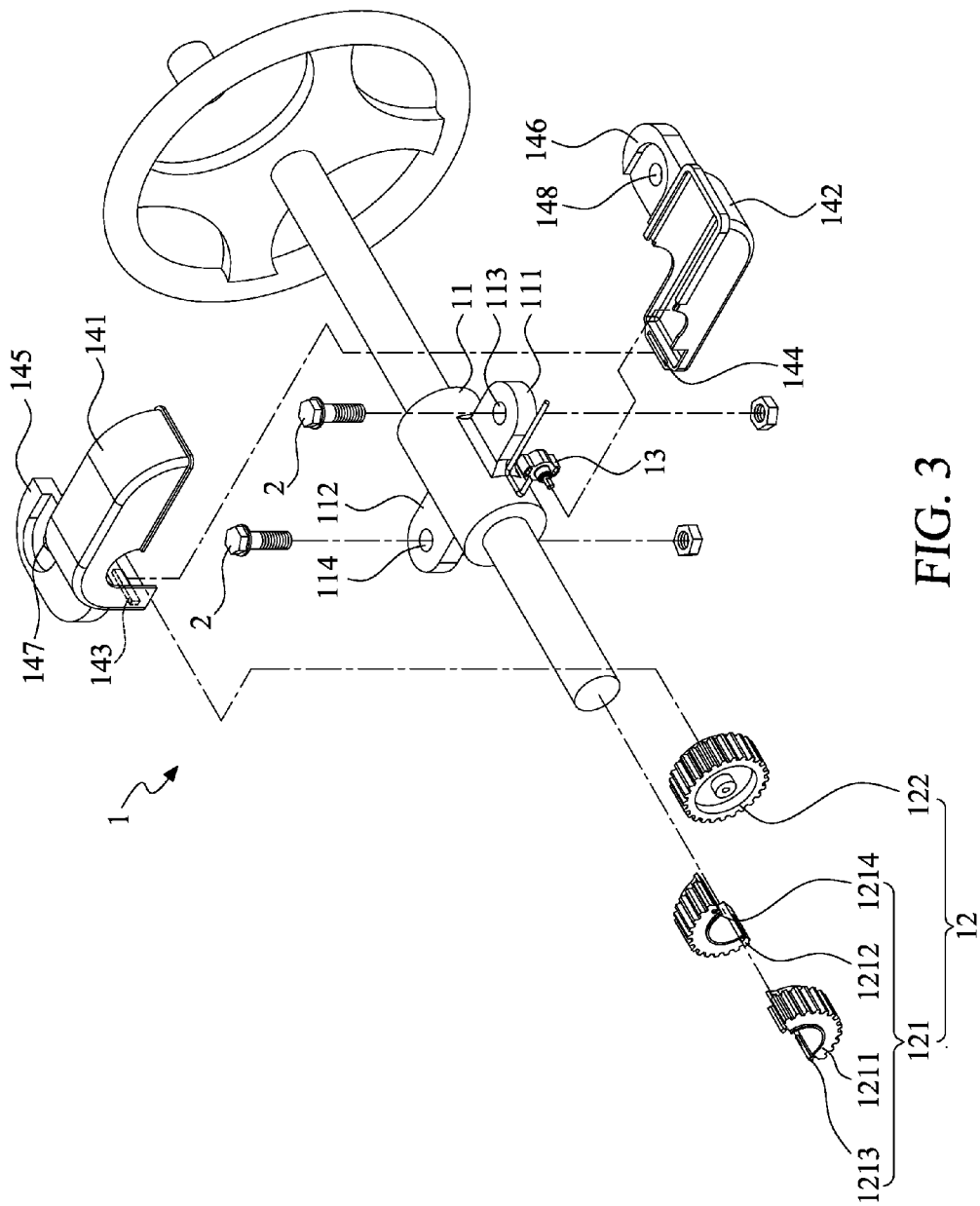
FIG. 3 is an exploded view of a second preferred embodiment of the present invention.
Figure 4:
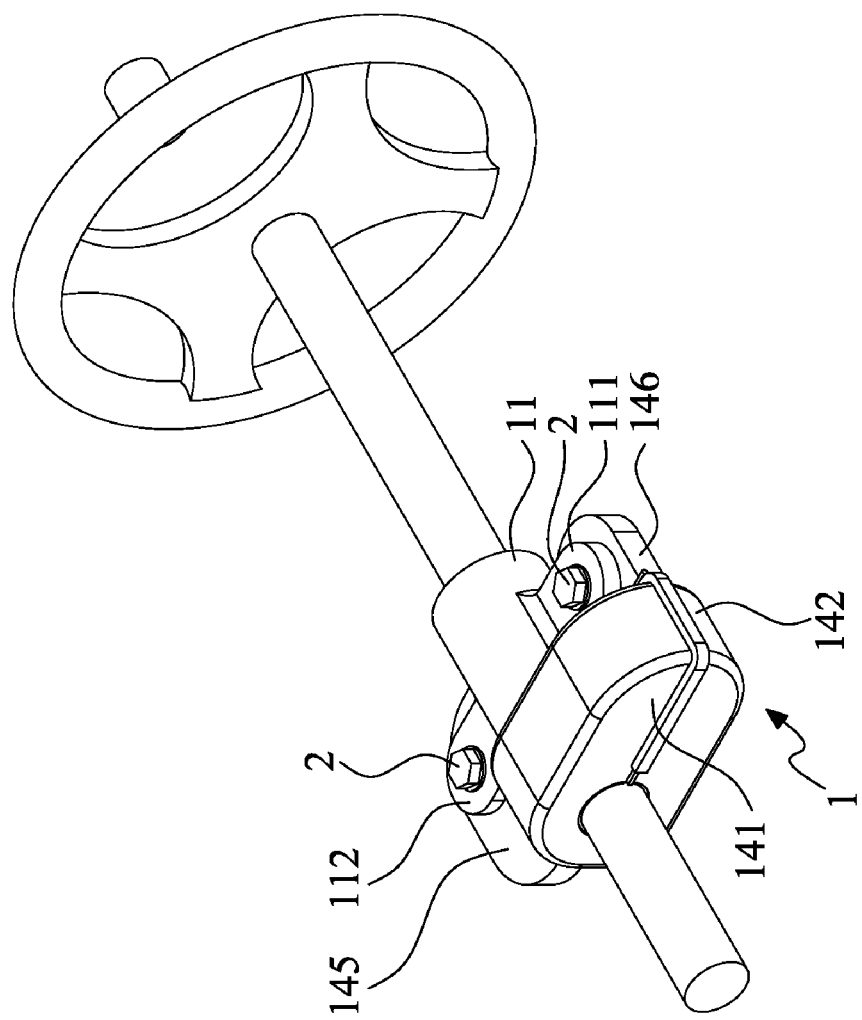
FIG. 4 is a perspective view of a second preferred embodiment of the present invention.

With reference to FIGS. 3 and 4 for an exploded view and a perspective view of a quick removable position sensor 1 in accordance with a second preferred embodiment of the present invention, the quick removable position sensor 1, a first lug 111 and a second lug 112 (as shown in FIG. 3) are extended from both sides of the steering wheel axle 11 respectively, and a first locking hole 113 and a second locking hole 114 are formed at central positions of the first and second lugs 111, 112 respectively.

In addition, a third lug 145 and a fourth lug 146 (as shown in FIG. 3) are installed on other sides of the first casing 141 and the second casing 142 and at positions corresponding to the first lug 111 and the second lug 112, and a third locking hole 147 and a fourth locking hole 148 are formed at central positions of the third and fourth lugs 145, 146 respectively, and two locking elements 2 are secured to the first locking hole 113 and the second locking hole 114 on both sides of the steering wheel axle 11 respectively (as shown in FIG. 4) to fit different structures of the steering wheel axles 11.

If the angular sensor 13 fails, a maintenance technician needs not to remove major components such as a dashboard, and a master control console (not shown in the figure) installed in the motor vehicle and adjacent to the steering wheel before examining and repairing the angular sensor 13, but the maintenance technical simply needs to remove the quick removable position sensor 1 installed onto the steering wheel axle 11 in the sequence of loosening and removing the locking elements 2 first, such that the locking elements 2 are released from the locked status with the locking holes 113, 114, 147, 148 (as shown in FIG. 3), or removing the casing 14 (as shown in FIG. 1) and then removing the first latch portion 143 and the second latch portion 144 of the casing 14, such that the first latch portion 143 and the second latch portion 144 are released from the latched status, and separating the casing 14 into the first casing 141 and the second casing 142, and then the maintenance technician removes the transmission mechanism 12 and the second transmission gear 122 of the transmission mechanism 12, such that after the second transmission gear 122 is separated from the first transmission gear 121 and the angular sensor 13, the maintenance technician moves away the first transmission gear 121 by both hands, such that the first snap portion 1213 and the second snap portion 1214 are released from the latched status, and the first transmission gear 121 is separated into two semi-circular transmission gears 1211, 1212, and finally the maintenance technical removes the angular sensor 13 installed onto the steering wheel axle 11 and replaces it with a new angular sensor 13, and then reinstalls the components sequentially.

In summation of the description above, the quick removable position sensor 1 of the present invention adopts the aforementioned simple components, so that it no longer needs to remove major components, such as the dashboard, the master control console components installed adjacent to the steering wheel anymore before the maintenance personnel can examine the angular sensor 13, the maintenance personnel simply needs to remove the aforementioned simple components for the examination the position sensor 13 to achieve the quick removal effect.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A quick removable position sensor, installed onto a steering wheel of a motor vehicle, and comprising:
    a transmission mechanism, for performing a turning movement;
    an angular sensor, with an end coupled to the transmission mechanism, for receiving a turning signal outputted by a turning of the transmission mechanism; and
    a casing, for wrapping the transmission mechanism and the angular sensor, such that the components in the casing can perform the turning movement and receive the turning signal,
    wherein the transmission mechanism comprises a first transmission gear and a second transmission gear, and the first transmission gear comprises two semi-circular transmission gears, and a first snap portion and a second snap portion separately disposed on a side of the semi-circular transmission gears, and
    wherein the second transmission gear includes gear teeth formed at an external periphery of the second transmission gear and engaged with and stacked onto gear teeth formed at an external periphery of the first transmission gear respectively.

2. The quick removable position sensor of claim 1, wherein the casing is comprised of a first casing and a second casing, and a first latch portion and a second latch portion are formed on external sides of the first casing and the second casing respectively, such that after the latch portions are latched, the casing is covered onto the transmission mechanism and the angular sensor.

3. A quick removable position sensor, installed onto a steering wheel of a motor vehicle, and comprising:
    a steering wheel axle;
    a transmission mechanism, sheathed onto a steering wheel axle, such that the transmission mechanism and the steering wheel axle can perform a turning movement;
    an angular sensor, with an end coupled to the steering wheel axle, and another end coupled to the transmission mechanism, for receiving a turning signal outputted by a turning of the transmission mechanism; and
    a casing, for wrapping the steering wheel axle, the transmission mechanism and the angular sensor, such that the components in the casing can perform the turning movement and receive the turning signal,
    wherein the casing is comprised of a first casing and a second casing, and a first latch portion and a second latch portion are formed on external sides of the first casing and the second casing respectively, such that after the latch portions are latched, the casing is covered onto the steering wheel axle, the transmission mechanism and the angular sensor, and
    wherein the steering wheel axle further includes a first lug and a second lug extended from both sides of the steering wheel axle respectively, and a first locking hole and a second locking hole formed at the central positions of the lugs respectively.

4. The quick removable position sensor of claim 3, further comprising:
    a third lug and a fourth lug, disposed on other sides of the first casing and the second casing, and extended from positions corresponding to the first lug and the second lug respectively;
    a third locking hole and a fourth locking hole, disposed at central positions of the first and second lugs respectively, and locked with the first locking hole and the second locking hole on both sides of the steering wheel axle through two locking elements respectively.

* * * * *